(12) United States Patent
Tsai et al.

(10) Patent No.: US 9,075,714 B1
(45) Date of Patent: Jul. 7, 2015

(54) ELECTRONIC SYSTEM WITH DATA MANAGEMENT MECHANISM AND METHOD OF OPERATION THEREOF

(71) Applicant: Western Digital Technologies, Inc., Irvine, CA (US)

(72) Inventors: Chun Sei Tsai, Tustin, CA (US); Carl E. Barlow, Lake Forest, CA (US); Thao Hieu Banh, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/307,345

(22) Filed: Jun. 17, 2014

Related U.S. Application Data

(60) Provisional application No. 61/992,405, filed on May 13, 2014.

(51) Int. Cl.
G11B 27/36 (2006.01)
G11B 5/58 (2006.01)
G06F 11/07 (2006.01)
G11B 20/18 (2006.01)

(52) U.S. Cl.
CPC ........ *G06F 11/0727* (2013.01); *G11B 20/1816* (2013.01); *G11B 20/1889* (2013.01); *G06F 11/0766* (2013.01)

(58) Field of Classification Search
CPC .... G11B 27/36; G11B 5/012; G11B 2220/20; G11B 20/10009; G11B 5/09; G11B 5/6005; G11B 5/59633; G11B 7/0045; G11B 7/0953; G11B 20/1883

USPC .................. 360/75, 31, 46; 369/53.13, 53.14, 369/53.17, 53.15, 53.35, 47.53
See application file for complete search history.

(56) References Cited

U.S. PATENT DOCUMENTS

| | | | |
|---|---|---|---|
| 4,603,357 A * | 7/1986 | Ramirez et al. ................. 360/46 |
| 5,418,767 A * | 5/1995 | Gaudet et al. .............. 369/53.16 |
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |

(Continued)

*Primary Examiner* — Nabil Hindi

(57) ABSTRACT

An apparatus includes: a media; a head over the media; a read channel, coupled to the head, configured to extract data from the media; control circuitry, coupled to the read channel, configured to execute a read command; and wherein the read channel is further configured to: generate, based on extracting the data from the media, a data condition indicator, and provide, for use by the control circuitry, the data and the data condition indicator.

29 Claims, 3 Drawing Sheets

(56) References Cited

U.S. PATENT DOCUMENTS

| | | |
|---|---|---|
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |

(56) References Cited

U.S. PATENT DOCUMENTS

| | | |
|---|---|---|
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,170,838 B2 * | 1/2007 | Toda et al. .................. 369/53.35 |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,545,593 B1 * | 6/2009 | Sun et al. ........................ 360/31 |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |

(56) References Cited

U.S. PATENT DOCUMENTS

| | | |
|---|---|---|
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,769,593 B1 | 7/2014 | Elliott et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton et al. |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2006/0013095 A1 * | 1/2006 | Liu et al. .................... 369/53.15 |
| 2007/0263506 A1 * | 11/2007 | Gulas et al. ................ 369/47.53 |
| 2008/0259487 A1 * | 10/2008 | Aida et al. ...................... 360/75 |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

* cited by examiner

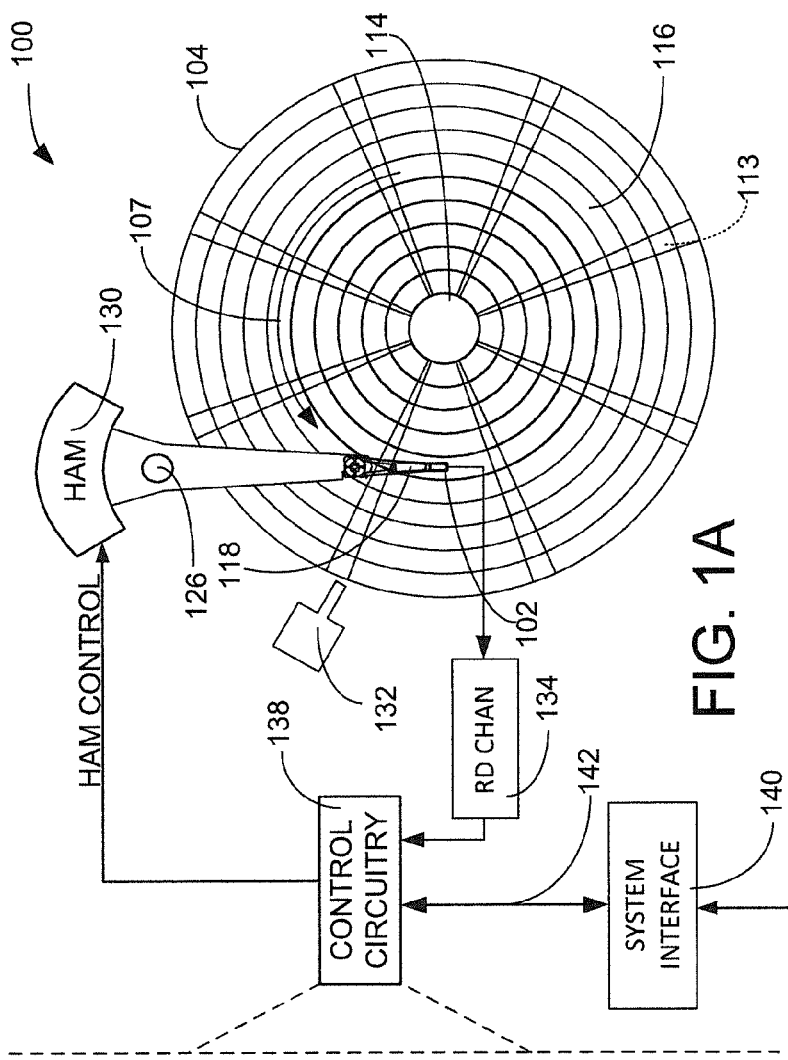
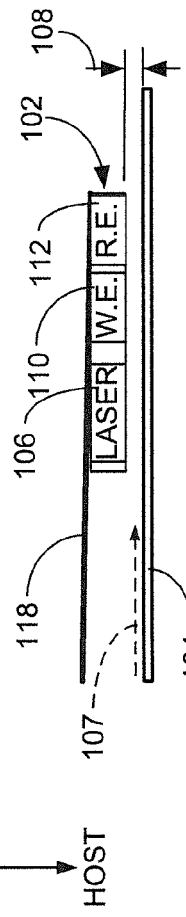
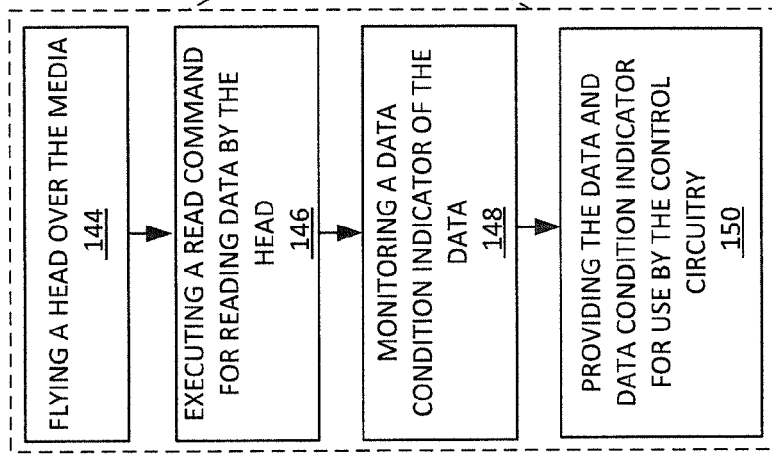

ELECTRONIC SYSTEM WITH DATA MANAGEMENT MECHANISM AND METHOD OF OPERATION THEREOF

CROSS-REFERENCE TO RELATED APPLICATION

This application claims the benefit of U.S. Provisional Patent Application Ser. No. 61/992,405 filed May 13, 2014, and the subject matter thereof is incorporated herein by reference thereto.

TECHNICAL FIELD

An embodiment relates generally to an electronic system, and more particularly to a system for data management.

BACKGROUND

Modern consumer and industrial electronic devices require storage of information, such as digital photographs, electronic mail, calendar, or contacts. These devices can be electronic systems, such as notebook computers, desktop computers, servers, televisions, and projectors, and are providing increasing levels of functionality to support modern life. Preserving the user data stored in the storage devices is of the utmost importance.

Different approaches have been used to monitor the general condition of the stored data. Each of these processes must include a monitoring process that can verify all of the data has been written correctly and will be available for the user whenever it is called back-up. The logistics for such a process can be burdensome and time consuming. In some cases the data can have a limited life span and must be regenerated in order to preserve it for future use.

Many of these data preservation processes can consume time, device resources, and can wear components of the device. The cost associated with the data preservation processes must be mitigated in order to balance the device availability and the protection of the data stored there. Since the preservation of the data is the primary task of the device, availability of the interface functions for retrieving or storing data can be a primary focus and sometime to the detriment of the physical device, such as head wear, media damage, or component failures.

BRIEF DESCRIPTION OF THE DRAWINGS

FIGS. 1A, 1B, and 1C show an operational diagram of an electronic system with data management according to one of the embodiments.

DETAILED DESCRIPTION

Figure 2:
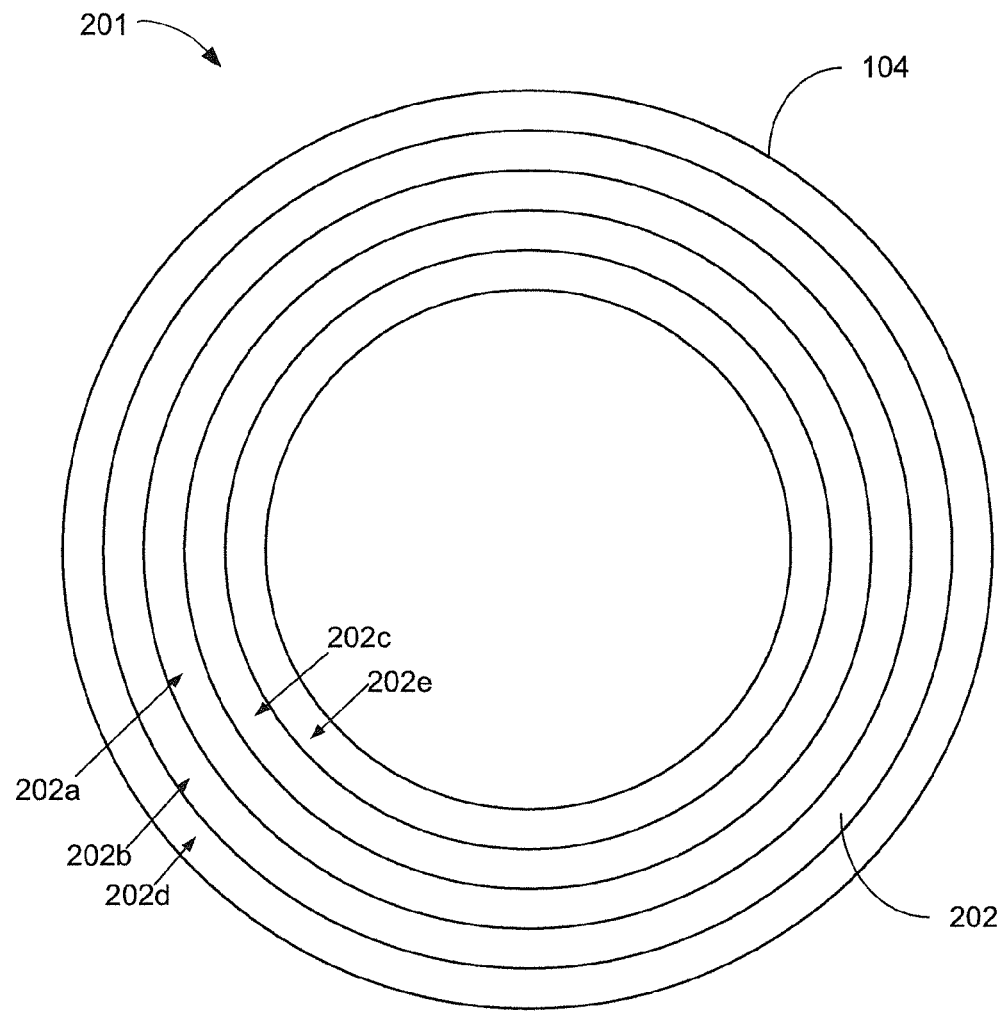
FIG. 2 provides an exemplary layout of a sector group mechanism in an embodiment.

Storage systems can include storage devices, such as hard disk drives (HDD), solid state drives (SSD), hybrid drives, and optical storage devices. In order to maintain data integrity many of the storage devices perform off-line or background data verification and maintenance processes. These processes are typically interleaved with interface operations in order to minimize the latency seen by the storage system host.

While the background scan activity is extremely beneficial, it nevertheless contributes to head wear and increased power consumption. Contemporary HDDs have shown over 60% of failed drives are due to head wear, as a result of excessive usage. As a result, a trade-off must be made in order to strike a balance between maintaining data integrity and over usage.

Some embodiments solve at least this problem by using the actual user reads in place of the background scan, thereby minimizing the needs to actually doing background scan. This mechanism can therefore reduce the need to excessively scan the disk while in idle, thus extending the longevity of the HDD by minimizing head wear/damage caused by the background scan. Further embodiments can also utilize system access, such as reserved space or boot sectors, without the need for background scan in the system spaces.

A need still remains for an electronic system as various embodiments with data management mechanism for providing reliable data while not prematurely wear-out the head. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the various embodiments. It is to be understood that other embodiments would be evident based on the present disclosure, and that system, process, or mechanical changes can be made without departing from the scope of an embodiment.

In the following description, numerous specific details are given to provide a thorough understanding of the various embodiments. However, it will be apparent that the various embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the various embodiments can be operated in any orientation.

Referring now to FIGS. 1A, 1B, and 1C, therein are shown an operational diagram of an electronic system 100 according to an embodiment. The electronic system 100 can represent an apparatus for one various embodiments. An embodiment depicted in FIGS. 1A, 1B, and 1C is shown as a hard disk drive, as an example, although it is understood that the electronic system 100 as the embodiment can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media storage.

In an embodiment the electronic system 100 includes a head 102 flying over a media 104. The head 102 can be mounted to a flex arm 118 attached to an actuator arm 122. The head 102 (FIG. 1B) can optionally include a laser 106 for heating the media 104 during part of a write process (e.g., the head is part of an Energy-Assisted Magnetic Recording (EAMR) drive). The flying height 108 can be adjusted (e.g., by use of a heater element in the head not shown in FIG. 1B) while writing data to the media 104 or as an error recovery process during reading from the media 104. Also in an embodiment of FIG. 1B, the head 102 comprises a write element 110 (e.g., an inductive coil) and a read element 112 (e.g., a magnetoresistive read element).

The media 104 is a structure for storing information. For example, the media 104 can be made of an aluminum alloy, ceramic/glass, or a similar non-magnetic material. The top and bottom surfaces of the media 104 can be covered with magnetic material deposited on one or both sides of the media 104 to form a coating layer capable of magnetization. As an example, the media 104 can be a disk platter for one embodiment of the electronic system 100 as a rotating storage system, such as a hard disk drive (HDD). As a further example, the media 104 can be a linear magnetic strip for one embodiment of the electronic system 100 as a linear storage system, such as a tape drive.

The laser 106, as an example, can be a laser diode or other solid-state based lasers. In addition, embodiments can employ any suitable techniques for focusing the laser 106 on the media 104, such as a suitable waveguide, magnifying lens, or other suitable optics. The laser 106 is increased to a write power in order to heat the disk, thereby decreasing the coercivity of the media 104 so that the data is written more reliably.

The spindle motor 114 can rotate the media 104, about a center of the media 104, at constant or varying speed 107. For illustrative purposes, the spindle motor 114 is described as a motor for a rotation, although it is understood that the spindle motor 114 can be other actuating motors for a tape drive, as an example.

As examples, a head actuation motor 130 can be a voice coil motor assembly, a stepper motor assembly, or a combination thereof. The head actuation motor 130 can generate a torque or force for positioning the head 102.

A tapered end of the flex arm 118 can include the head 102. The flex arm 118 can be mounted to the actuator arm 122, which is pivoted around a bearing assembly 126 by the torque generated by the head actuation motor 130. The head 102 can include a single instance of the write element 110 and a single instance of the read element 112 that is narrower than the write element 110. The head 102 can fly over the media 104 at a dynamically adjustable span of the flying height 108, which represents a vertical displacement between the head 102 and the media 104. The head 102 can be positioned by the flex arm 118 and the actuator arm 122 and can have the flying height 108 adjusted by control circuitry 138.

The head 102 can be positioned over the media 104 along an arc shaped path between an inner diameter of the media 104 and outer diameter of the media 104. For illustrative purposes, the actuator arm 122 and the head actuation motor 130 are configured for rotary movement of the head 102. The actuator arm 122 and the head actuation motor 130 can be configured to have a different movement. For example, the actuator arm 122 and the head actuation motor 130 could be configured to have a linear movement resulting in the head 102 traveling along a radius of the media 104.

The head 102 can be positioned over the media 104 to create magnetic transitions or detect magnetic transitions from the coating layer that can be used to representing written data or read data, respectively. The position of the head 102 and the speed 107 of the media 104 can be controlled by the control circuitry 138. Examples of the control circuitry 138 can include a processor, an application specific integrated circuit (ASIC) an embedded processor, a microprocessor, a hardware control logic, a hardware finite state machine (FSM), a digital signal processor (DSP), digital circuitry, analog circuitry, optical circuitry, or a combination thereof. The control circuitry 138 can also include memory devices, such as a volatile memory, a nonvolatile memory, or a combination thereof. For example, the nonvolatile storage can be non-volatile random access memory (NVRAM) or Flash memory and a volatile storage can be static random access memory (SRAM) or dynamic random access memory (DRAM).

A system interface 140 can couple the control circuitry 138 to a host electronics (not shown). The system interface 140 can transfer user data 142 between the host electronics and the control circuitry 138. The user data 142 can be encoded or decoded by the control circuitry 138 in preparation for transfer to or from the media 104.

The control circuitry 138 can be configured to control the spindle motor 114 for adjusting the speed 107 of the media 104. The control circuitry 138 can be configured to cause the head 102 to move relative to the media 104, or vice versa. The media 104 can include a plurality of servo tracks 113 that allow the control circuitry to control the positioning of the head 102 relative to data tracks 116. The control circuitry 138 can also be configured to control the flow of information to the head 102 for writing to the data tracks 116 of the media 104. The information sent to the head 102 can include the preconditioning pattern, direct current erase signals, user data, or a combination thereof.

In one embodiment, the electronic system 100 further comprises control circuitry 138 configured to execute the flow diagrams of FIG. 1C. As an example, blocks 144 to 150 can represent the flow diagram where an embodiment is employing a data management mechanism for maintaining data integrity.

Block 144 shows flying a head over a media for execution by the electronic system 100, such as a manufacturing test fixture, a hard disk drive, a tape drive, a hybrid drive, or an optical drive.

Block 146 shows executing a read command for reading data by the head. The read command can be any interface read command issued through the system interface 140 for execution by the electronic system 100.

Block 148 shows monitoring a data condition indicator of the data. This action may help determine robustness of the data accessed, including for example, whether data required any correction operations, the length of any bit corrections, how many iterations of correction was required, whether the data accessed by the read command is likely to degrade by the time it is accessed by future read commands. In one embodiment, the data that are read through the system interface 140 (e.g., a data track 116 or any portion thereof) and do not require any corrective action (e.g., read the data) are logged as scanned, so a background process does not repeat the reading of such data unnecessarily.

Block 150 shows providing the data and the data condition indicator for use by the control circuitry. The use may include, for example, determining what blocks of the used capacity must be checked for data integrity. While the background scan process can disposition the blocks that show signs of errors or require correction to be read correctly, the data that were correctly read in block 146 without correction are, in one embodiment, not readdressed by the background scan process.

It has been discovered that an embodiment of the electronic system 100 can improve manufacturing yield. The electronic system 100 can provide a holistic view of the robustness of the data written to the data tracks 116 of the media 104. Any data that shows susceptibility to data errors or requires bit corrections can be mapped through the scanned table in order to identify possible weak areas of the media 104. This holistic view can be an early predictor of problems that can occur as the electronic system 100 is used in the field.

An embodiment can be implemented in firmware to select the scanned table from the non-volatile memory on power-on for analyzing the holistic view of the user data stored in the electronic system 100.

Referring now to FIG. 2, therein is shown an exemplary layout of a sector group mechanism 201 in an embodiment. The exemplary layout of the sector group mechanism 201 depicts the media 104 having a plurality of sector groups 202 partitioned adjacent to each other across the surface of the media 104.

In one embodiment, the media 104 can be partitioned into a plurality of sector groups 202, which can also be referred to as zones, zip codes, data pages, super blocks, or bulk pages. By way of an example, five of the sector groups 202 are shown although it is understood that the entire capacity of the media 104 can be divided into the sector groups 202. Each of the sector groups 202 can comprise one or more of the data tracks 116 of FIG. 1A of the media 104, or just a portion of a data track 116. Although five of the sector groups 202a-e are shown for ease of discussion, it is understood that the media 104 can include any number of sector groups 202.

In one embodiment, each of the sector groups 202 comprises four of the data tracks 116, which can reduce the total number of the sector groups 202 managed by the control circuitry 138 of FIG. 1A. It is understood that the number of the data tracks 116 included in the sector groups 202 can differ, although each of the sector groups includes the same number of the data tracks 116. It is further understood that a sector group 202 can include only a portion of the data track 116.

To protect the data integrity in the sector groups 202, the control circuitry 138 can perform a refresh process on each of the sector groups 202, by reading all or substantially of the data tracks 116 within the sector groups 202 to determine whether the data tracks 116 need to be rewritten or relocated. The process of refreshing the data tracks 116 can include re-writing the contents of the data tracks 116 at the existing location or moving the data within the data tracks 116 to a new physical location. In one embodiment, the control circuitry 138 can increase refresh frequency for a particular one of the sector groups 202 when the control circuitry 138 detects an event that contributes to data degradation in the sector groups 202.

The control circuitry 138 can use the refresh process to maintain the integrity of the data stored in the sector groups 202. While the operation of the electronic system 100 proceeds, the system interface 140 can be reading the contents of the data tracks 116 within one or several of the sector groups 202. Since these sector groups 202 have been verified by the executing the read commands, any sector groups 202 that contain the data tracks 116 that are error free can be marked as having been refreshed, without performing additional checks.

It is understood that the control circuitry 138 can establish a threshold of minor error correction that can be applied to the data tracks 116, which are accessed through the system interface 140, without risk of corruption of the data within the data tracks 116. In these cases, the data tracks are considered to be error free. In the event the data tracks 116, which are accessed through the system interface 140, degrade and need additional levels of error correction, the individual data sectors within the data tracks 116 can be flagged as suspect, for later analysis by the refresh process.

Figure 3:
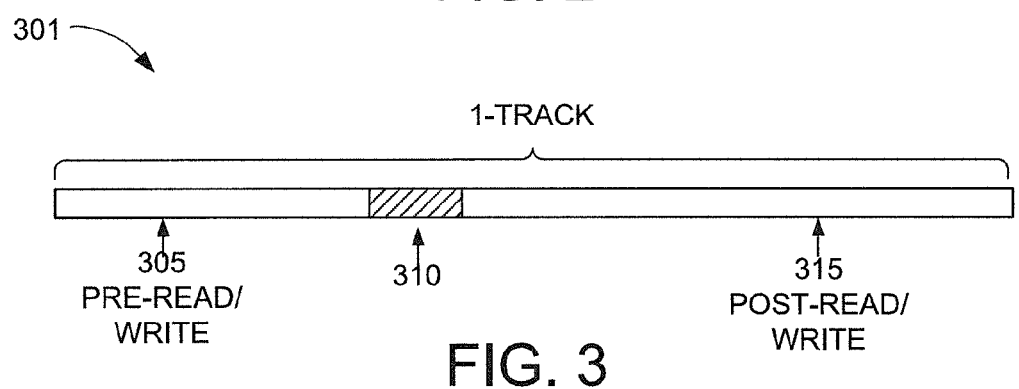
FIG. 3 is an exemplary layout of a data track in an embodiment.

Referring now to FIG. 3, therein is shown an exemplary layout of a data track 301 in an embodiment. The exemplary layout of a data track 301 can be substantially the same as one of the data tracks 116 of FIG. 1A.

In an embodiment, the sector groups 202 of FIG. 2 can include at least one of the data tracks 116, when a data access command is received through the system interface 140 of FIG. 1A accesses a portion of the data tracks 116, the control circuitry 138 of FIG. 1A can also read data from the portion of the data track 301 not being accessed by the data access command. By way of an example, the data access command, such as a read command, can access a portion 310 of the data track 301. In this example, the control circuitry 138 can extend the lengths of the pre-read 305, post-read 315, or a combination thereof of the track to cover the entirety of the data track 301. The pre-read 305 can correspond to rotation of the media 104 to position the head 102 at the portion 310 of the track being accessed by the data access command. The post-read 315 can correspond to rotation of the media 104 after the portion 310 of the track being accessed by the access command. In this embodiment, the control circuitry 138 can read data during the pre-read 305 and post-read 315 to determine the condition of this particular one of the sector groups 202.

Various embodiments incorporate the rotational latency of the media 104 associated with positioning the head 102 at the portion 310 of the track being accessed by the data access command to access the entire track. In this embodiment, the rotational position optimization (RPO) algorithm can take into account that the pre-read 305 and/or post-read 315 are extended to cover the entire track when ordering the data access command with other commands. For the example of a read command, the control circuitry 138 can extend the pre-read 305 and/or the post-read 315 before and after the portion 310 being requested by the read command to read the entirety of the data track 301.

After reading data from the sector groups 202, the control circuitry 138 uses the read data to determine the condition of the data in the sector groups 202, and thus whether this particular one of the sector groups 202 needs to be refreshed. The control circuitry 138 can use the read data to determine the condition of the data in the sector groups 202 based on one or more of the following indicators: error correct code (ECC) symbol errors in the read data, decoding information related to low-density parity check codes, circular redundancy codes (CRC) or other error correction/detection methods, or other similar indicators related to the read process.

In an embodiment, if the control circuitry 138 determines that the condition of the data in the sector groups 202 is bad, then the control circuitry 138 can schedule the sector groups 202 for refresh. In this case, the control circuitry 138 can refresh the sector groups 202 using the data already read, e.g., due to host command(s), from the sector groups 202 to determine the condition of the sector groups 202. If the control circuitry 138 determines that the condition of the data in the sector groups 202 is good, then the control circuitry 138 can mark the status of the sector groups 202 as having been refreshed. The distinction between good and bad sector groups may be based, at least in part, on a comparison of (1) an indicator based on data collected as part of the execution of host read commands and (2) adjustable and/or pre-defined threshold(s).

In an embodiment, if the control circuitry 138 checks the condition of the sector groups 202 in response to a host read command, then the control circuitry 138 sends the portion of the read data corresponding to the data requested by the host read command to the host. The control circuitry 138 can maintain the rest of the contents of the data track 301 in a memory structure for access by subsequent data access commands.

It has been discovered that the control circuitry 138 can reduce the amount of time associated with data verification through the refresh process by extending a data access command received through the system interface 140 to include an entire data track 301 or an entire one of the sector groups 202. In instances where the sector groups 202 include multiple of the data tracks 116, they can be configured in a cylinder configuration so the sector groups 202 can be spread across multiple units of the head 102. This configuration can minimize the repositioning of the heads 102 when reading the entirety of the sector groups 202.

Figure 4:
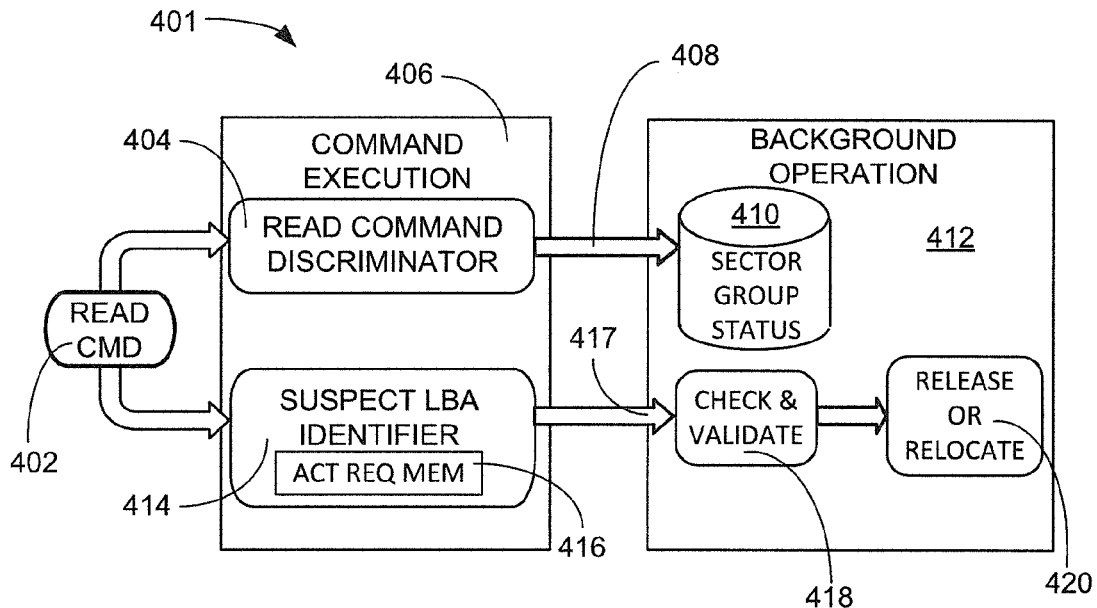
FIG. 4 provides an operational block diagram of one of the embodiments of a data management system.

Referring now to FIG. 4, therein is shown an operational block diagram of an embodiment of a data management system 401. In one embodiment, the control circuitry 138 of FIG. 1A may include some or all of the components shown in the data management system 401. The operational block diagram of the embodiment of the data management system 401 depicts a read command 402, which can be received through the system interface 140 of FIG. 1A. Statistics can verify that over seventy percent of the commands received through the system interface 140 are read commands.

While the large majority of the read commands 402 are successfully completed without the use of error correction, some sectors can only be recovered with a correction level exceeding a threshold, which indicates that if the read were executed in the factory, the sector would have been deemed unacceptable. If those sectors can be identified while being read to fulfill a command received through the system interface 140, they can be isolated and analyzed for potential failures before data corruption can occur. Since the identification of the sector is being done while executing the read command 402 through the system interface 140, it also achieves the second screening for drive data integrity, thereby eliminating the needs to run yet another scan of the same sectors while in idle mode and minimizing wear of the head 102 of FIG. 1B.

In one embodiment, some or all of the content of the media 104 of FIG. 1A can be divided into a number of sector groups 202 of FIG. 2 for tracking the data integrity of the data tracks 116 of FIG. 1A within the sector groups 202. The sector group 202 concept can be used for accounting of the logical block address in the total accessible capacity including high capacity configurations of the electronic system 100. By way of an example the sector group 202 can include four full units of the data tracks 116 of data, which can contain approximately 4 MB of data. It is understood that the sector groups 202 can include a different number of the data tracks 116.

In one embodiment, a read command discriminator 404 can be part of a command execution 406. The read command discriminator 404 keeps track of the read commands 402 issued through the system interface 140. When the read covers the entire range of the sector group 202, a status bus 408 will update a sector group status 410 as the sector group 202 having been "Read". In one embodiment, a background scan 412 will not execute a read scan in any of the sector groups 202 until the read flag is cleared by any of the data tracks 116 in the sector groups 202 being written.

In one embodiment, when a sector requires a level of error correction in excess of a threshold it is identified as a potential risk by a suspect logical block address (LBA) identifier 414. The suspect LBA identifier 414 is loaded into an action required memory 416 during the read command 402. The action required memory 416, such as a FIFO, can be deep enough to accommodate 1-data-track worth of sectors, though the size can vary in various embodiments.

Upon completion of the read command 402, the information in the action required memory 416 will be loaded into a volatile memory such as a DRAM. In one embodiment, the content of the volatile memory is regularly flushed to the reserve capacity of the media 104 (or some other non-volatile memory such as solid-state memory) to protect from unexpected power loss. In some embodiments, the suspect LBA identifier 414 may be loaded directly into a volatile memory such as a DRAM that is used by the control circuitry 138 without going through an action required memory.

In one embodiment, in real-time the system interface 140 can receive the read command 402 normally while the read command discriminator (RCD) 404 tracks range of LBAs and identifies whether an entire range of a specific one of the sector groups 202 had been completely covered. The RCD 404, in its simplest form in an embodiment, can be a single thread design where it can only track consecutive read commands 402 such as a sequential read. When the sequential operations of the read commands 402 covers any of the sector groups 202, the sector groups 202 can be marked as "Read." In addition, in one embodiment, the RCD 404 can take into account any pre-/post-read activities previously shown in FIG. 3.

In one embodiment, the RCD 404 can track multiple threads. In this case, it tracks multiple strings of the read commands 402 that can cover several of the sector groups 202 at the same time. By way of example, the RCD 404 can track history of the successive instances of the read commands 402 with a reasonable amount of depth in order to discriminate the pattern of the read commands 402 in order to identify the sector groups 202 to enter into the sector group status 410. This operation can be protected from unexpected power loss, meaning the information can be stored in the reserve capacity of the media 104 with frequent updates in order to be effective. When the electronic system 100 is idle (no command pending from the system interface 140), an check & validate module 418 can commence in the background scan 412. The check & validate module 418 read the action required memory 416 to determine which of the LBA's are suspect. In one embodiment, the check & validate module 418 re-reads the LBA's stored in the action required memory 416 through an action required bus 417 and attempts to confirm the data errors. If the check & validate module 418 is unable to confirm the data error(s) associated with an LBA, the LBA is removed from the action required memory 416. However, if the check & validate module 418 is able to confirm the data errors, the LBA/sector is subjected to a sector screen module 420, which may take one or more additional corrective actions in the various embodiments. For example, the module 420 may perform an action in which the sector is relocated temporarily and re-written to demonstrate the validity of the original sector site. If the original sector site fails the sector screen module 420, the contents of the LBA are relocated to a reliable sector location. This operation of the sector screen module 420 can continue until the action required memory 416 is empty, or when a timer or host command interrupt is triggered to stop processing.

It has been discovered that the read command discriminator 404 can minimize the amount of verification that is performed in the background scan 412. By minimizing the amount of operations performed by the background scan 412, excess wear on the head 102 can be reduced and the reliability of the electronic system 100 can be improved.

Figure 5:
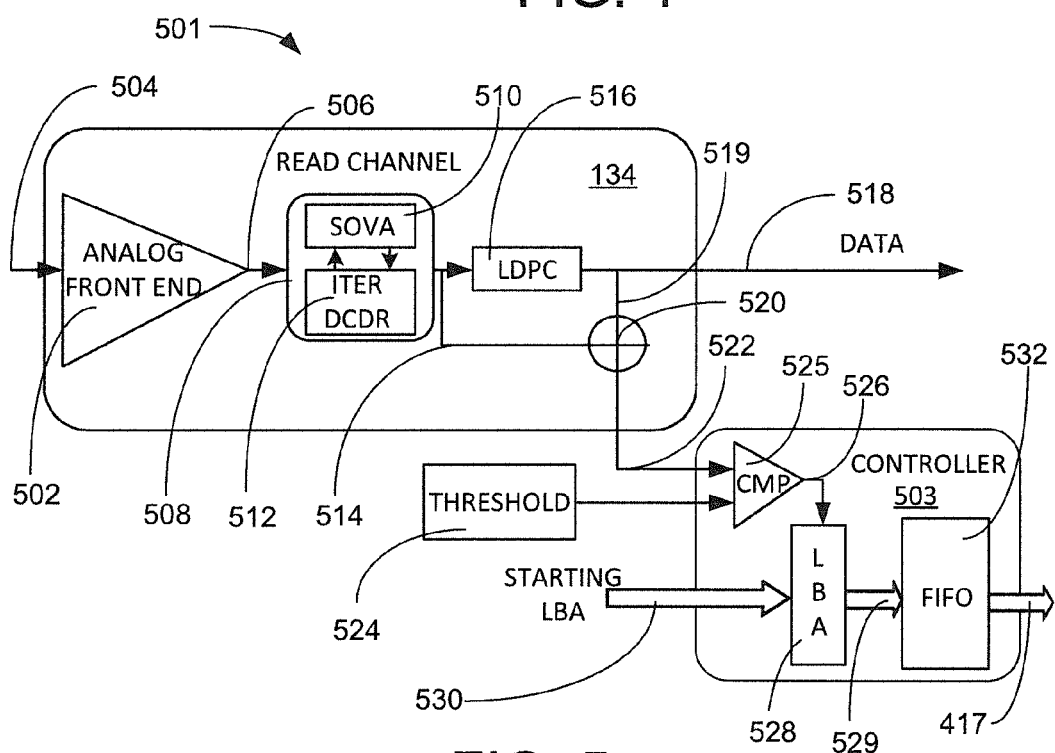
FIG. 5 is a block diagram of a data management mechanism according to an alternative embodiment.

Referring now to FIG. 5, therein is shown a block diagram of a data management mechanism 501 according to an embodiment. As shown, the data management mechanism 501 also includes a controller 503 and a read channel 134. In one embodiment, the control circuitry 138 of FIG. 1A may include the controller 503, the read channel 134, and/or any other portion of the data management mechanism 501. In another embodiment the controller 503, the read channel 134, and/or any other portion of the data management mechanism 501 may be distinct from the control circuitry 138. The block diagram of the data management mechanism 501 depicts the read channel 134 having an analog front end 502 for receiving a raw data signal 504. The raw data signal 504 can include servo data, system data, user data, or a combination thereof.

The analog front end 502 can produce qualified data 506, which in one embodiment does not include servo data, but does pass system data and user data to a data correction unit 508, such as a hardware error correction unit. The data correction unit 508 can include a bit correction unit 510, such as a non-linear data/soft-output Viterbi algorithm, coupled to an iteration decoder 512. The iteration decoder 512 can be monitor how many iterations are required to satisfactorily correct the bits, or how many iterations are performed before giving up on the correction of the qualified data 506.

A correction bus 514 can include the bits corrected (BC) indicator and an iteration count (IC) indicator. A low-density parity check (LDPC) unit 516 can be coupled to the data correction unit 508 for passing the corrected data. A read channel data bus 518 can pass the content of the LBA being read to the control circuitry 138 of FIG. 1A. The LDPC unit 516 can also transfer a locality error indicator 519 to a status node 520 for combining the locality error indicator 519 to the correction bus 514 for forming a data condition indicator 522. It is understood that the combining of the locality error indicator 519 and the correction bus 514 can be a logical process, a grouping process, a mathematical process, or a combination thereof. By way of an example, the data condition indicator 522 includes IC and BC data must be wide enough (2 symbols for example) to accept both IC and BC data.

A threshold register 524, can establish a guideline for determining a suspect LBA 529, can comprise both channel quality metrics (IC and BC) and the read channel data bus 518, which can be transmitted concurrently. A data correction comparator 525 can compare the values from the threshold register 524 with the data condition indicator 522 for generating a captured LBA 526. The captured LBA 526 can cause an LBA counter 528 to flag the suspect LBA 529 as having errors in excess of the threshold. The LBA counter 528 can be loaded from a starting LBA indication 530 provided by the control circuitry 138. The output of the data correction comparator 525 can be one bit, an "OR function" for either IC or BC trigger, multiple bits, a pulse, or a string of pulses. In certain embodiments a more involved comparison using more than one triggers may be used. The threshold register 524 is, in one embodiment, a programmable register with update on-the-fly capability.

The suspect LBA 529, such as a number of the LBA that exceeds the error level established by the threshold register 524, can be coupled to an LBA memory 532 capable of collecting all of the sectors in the data track 116 of FIG. 1A including sectors read during pre-read operations, post-read operations, or a combination thereof. The LBA memory 532 can be operated as a first-in-first-out (FIFO). While the error corrected contents of the read channel data bus 518 can be transferred through the system interface 140 of FIG. 1A, all of the sectors that exceed the error correction levels established by the threshold register 524 can be made available to the control circuitry 138, through the action required bus 417, for analysis of the physical locations of the suspect LBA 529 by the background operation 412 of FIG. 4.

By way of an example, the suspect LBA 529 can be read by the control circuitry 138 at completion of each physical read command. In one embodiment, prior to the execution of the next command (internal or external operation) the starting LBA bus 530 is loaded to the LBA counter 528 in order to track the LBA number as each sector is read from the media 104 of FIG. 1A. Each sector read can increment the LBA counter 528. However, in this example, only the flagged LBA number, the suspect LBA 529, is loaded to the LBA memory 532 for use by the control circuitry 138 after the read command execution has completed.

For example, an aspect of some embodiments is to utilize the read commands delivered through the system interface 140 to identify possible exposures to data integrity issues on the sectors being read by the system interface 140. Furthermore, since completion of the command is of paramount importance, some embodiments normally would use the most powerful settings to recover the user data when executing the read command, as a result, subtle differences in level of correction can be detected, as the proscribed level established by the threshold register 524. This aspect can preempt the potential data losses by proactively maintaining the data tracks 116.

Various embodiments of the electronic system 100 offer the following aspects:

The command execution 406 of FIG. 4 can expose a potential data loss caused by a bad location on the media 104 or poorly written.

Reduction of activity needed to perform the background operation 412 of FIG. 4 can reduce the wear of the head 102 of FIG. 1A and improve the longevity of the electronic system 100.

Since the often-read user data represents the LBA's that are most protected by this feature, data integrity where the user matters the most is vastly improved. While any seldom read sectors are addressed by the background operation 412.

In one embodiment, the electronic system 100 can provide a drive health indicator based on the data condition indicator of the condition of the data stored within the media 104, which can include both user data and system data. The drive health indicator can identify suspect areas in the media 104 that can be avoided in future use to assure reliability of the data as well as minimizing any damage that might occur to the head 102 by continuing to operate in the suspect areas of the media 104. For example, the drive health indicator may include historical and/or current statistics and/or counts related to suspect LBAs, bit error, correction effort level (e.g., number of iterations, how often used). The indicator may be a composite score based on these counts and/or statistics.

The electronic system 100 has been described with module functions or order as an example. The electronic system 100 can partition the modules differently or order the modules differently. For example, the sequence of actions shown in FIG. 1C may be different in some embodiments, with some actions omitted and/or combined. As another example, the LBA number could be derived from the servo tracks 113 information read from the data track 116 on the media 104 and passed through the read channel 134 of FIG. 1A. As yet another example, while the description of various embodiments uses the examples of data tracks from a magnetic rotating media, some embodiments are applicable to data stored on any media, including blocks/pages of data stored in solid-state memory. For example, the aforementioned capture of data condition indicator can be performed in the controller 503 coupled with a solid-state memory read channel, and the various uses of the data condition indictor including reduction of background scan processes can be applied to data stored in solid-state memory as well.

The modules described in this application can be implemented as instructions stored on a non-transitory computer readable medium to be executed by the control circuitry 138 in the electronic system 100. The non-transitory computer medium can include the memory of the integrated circuit in the electronic system 100. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of various embodiments is that they valuably supports and services the historical trend of reducing costs, simplifying systems, and increasing performance.

These and other valuable aspects of the various embodiments consequently further the state of the technology to at least the next level.

While the various embodiments have been described in conjunction with a specific best mode, it is to be understood that many alternatives, modifications, and variations will be apparent to those skilled in the art in light of the aforegoing description. Accordingly, the embodiments are intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
   a media;
   a head over the media;
   a read channel, coupled to the head, configured to extract data from the media;
   control circuitry, coupled to the read channel, configured to execute a read command; and
   wherein the read channel is further configured to:
      generate, based on extracting the data from the media, a data condition indicator including a locality error indicator, and
      provide, for use by the control circuitry, the data and the data condition indicator.

2. The apparatus as claimed in claim 1 wherein the control circuitry further configured to:
   detect, based on the data condition indicator, a suspect location on the media when the read command is executed; and
   perform a data maintenance operation.

3. The apparatus as claimed in claim 1 wherein the control circuitry further configured to:
   detect, based on the data condition indicator, a suspect location on the media when the read command is executed; and
   relocate the data of the suspect location.

4. The apparatus as claimed in claim 1 wherein the control circuitry further configured to:
   detect, based on the data condition indicator, a suspect location on the media when the read command is executed; and
   re-read the data to confirm data integrity.

5. The apparatus as claimed in claim 1 wherein the control circuitry is further configured to determine a drive health indicator from the data condition indicator.

6. The apparatus as claimed in claim 1 wherein the control circuitry is further configured to compare the data condition indicator to a threshold.

7. The apparatus as claimed in claim 1 wherein the control circuitry is further configured to store an address when a suspect address flag is set by the data condition indicator exceeding a threshold.

8. The apparatus as claimed in claim 1 wherein the control circuitry is further configured to update a threshold for the data condition indicator.

9. The apparatus as claimed in claim 1 wherein the data condition indicator includes a number of bits corrected count and an iteration count.

10. The apparatus as claimed in claim 1 wherein the control circuitry is further configured to characterize a failure mode of an address location based on the data indicator.

11. The apparatus as claimed in claim 1 wherein the control circuitry is further configured to monitor a logical block address (LBA) usage status of a sector group on the media when the read command is executed.

12. The apparatus as claimed in claim 1 wherein the control circuitry is configured to execute the read command, includes a host initiated read command, a pre-read command, post-read command, or combination thereof executed.

13. A method of operating an apparatus, the method comprising:
   flying a head over a media;
   executing a read command for reading data by the head over the media;
   monitoring a data condition indicator, of the data from the media, including a locality error indicator; and
   providing the data and the data condition indicator for use by control circuitry of the apparatus.

14. The method as claimed in claim 13 further comprising:
   detecting a suspect location on the media based on the data condition indicator; and
   performing a data maintenance operation.

15. The method as claimed in claim 13 further comprising:
   detecting a suspect location on the media based on the data condition indicator; and
   relocating the data of the suspect location.

16. The method as claimed in claim 13 further comprising:
   detecting a suspect location on the media based on the data condition indicator; and
   re-reading the data for confirming a data integrity of the data.

17. The method as claimed in claim 13 wherein monitoring the data condition indicator includes determining a drive health indicator.

18. The method as claimed in claim 13 further comprising comparing the data condition indicator to a threshold.

19. The method as claimed in claim 13 further comprising setting a suspect address flag including storing an address when the data condition indicator exceeds a threshold.

20. The method as claimed in claim 13 further comprising updating a threshold for comparing the data condition indicator.

21. The method as claimed in claim 18 wherein comparing the data condition indicator includes comparing a number of bits corrected count and an iteration count to the threshold.

22. The method as claimed in claim 13 further comprising characterizing a failure mode of an address location based on the data indicator.

23. The method as claimed in claim 13 further comprising monitoring a logical block address (LBA) utilization of a sector group on the media when executing the read command.

24. The method as claimed in claim 13 wherein executing the read command includes executing a host initiated read command, a pre-read command, post-read command, or combination thereof.

25. An apparatus comprising:
media for storing data;
a read channel configured to extract data from the media;
control circuitry, coupled to the read channel, configured to execute a read command; and
wherein the read channel is further configured to:
generate, based on extracting the data from the media, a data condition indicator including a locality error indicator, and
provide, for use by the control circuitry, the data and the data condition indicator.

26. The apparatus as claimed in claim 25 wherein the media comprises solid-state memory.

27. A method of operating an apparatus, the method comprising:
executing a read command for reading from media;
monitoring a data condition indicator, of the data from the media, including a locality error indicator; and
providing the data and the data condition indicator for use by control circuitry of the apparatus.

28. The method as claimed in claim 27 wherein the media comprises solid-state memory.

29. An apparatus comprising:
a media;
a head over the media;
a read channel, coupled to the head, configured to extract data from the media;
control circuitry, coupled to the read channel, configured to execute a read command; and
wherein the read channel is further configured to:
generate, based on extracting the data from the media, a data condition indicator, and
provide, for use by the control circuitry, the data and the data condition indicator wherein the data condition indicator includes a number of bits corrected count and an iteration count.

* * * * *